Figure 3:
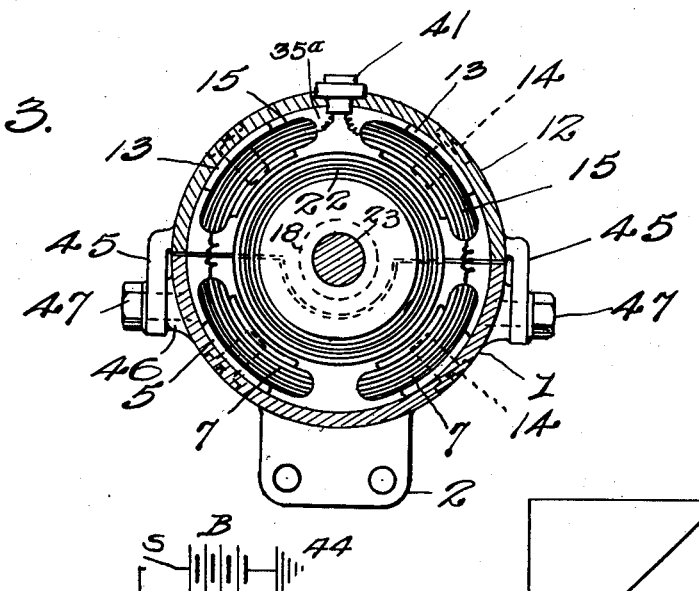

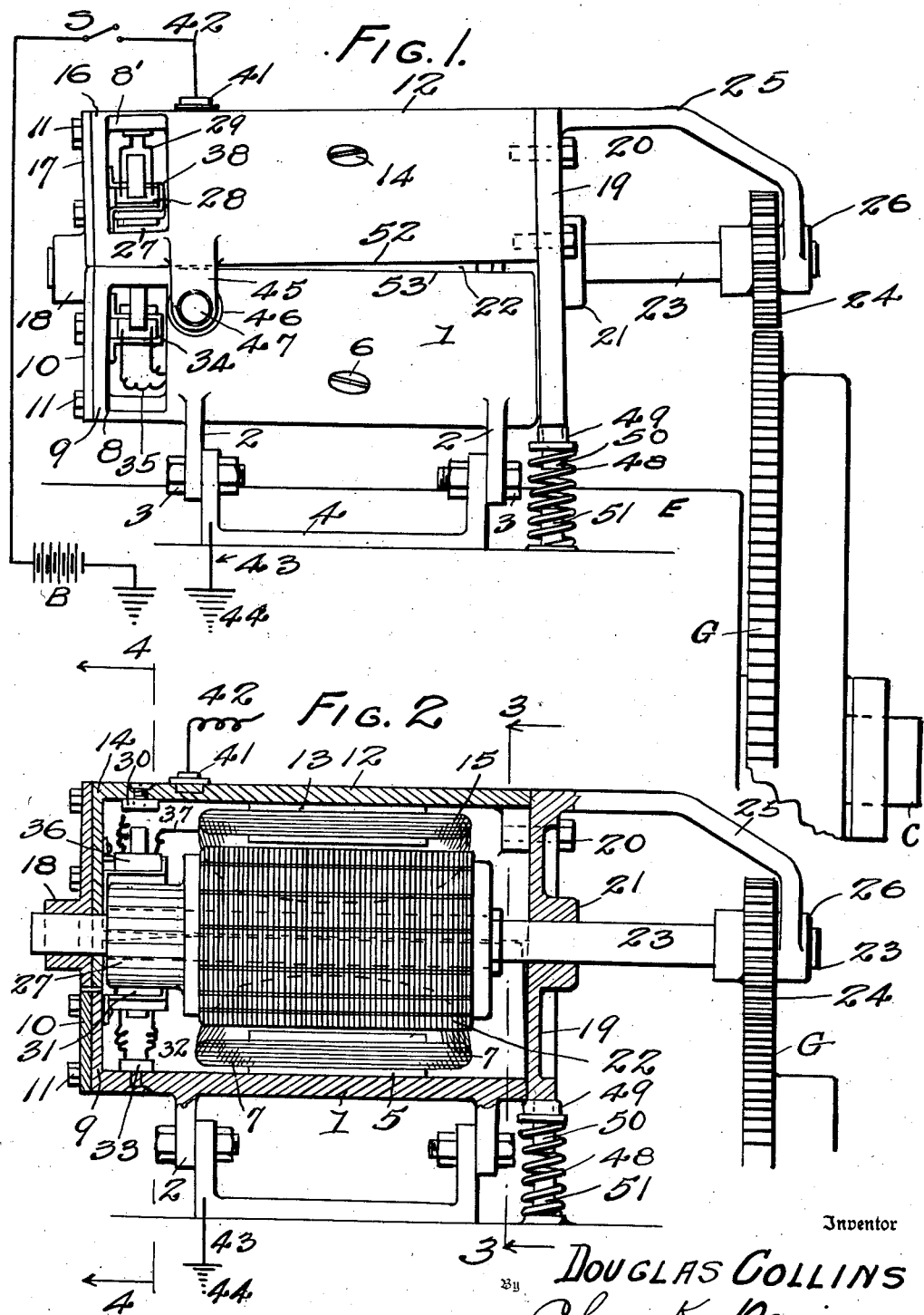

Nov. 3, 1936.  D. COLLINS  2,059,624
ELECTRIC STARTING MOTOR
Filed March 5, 1934   2 Sheets-Sheet 2

Inventor
DOUGLAS COLLINS
By Chas K. Davis
Attorney

Patented Nov. 3, 1936

2,059,624

UNITED STATES PATENT OFFICE 2,059,624

ELECTRIC STARTING MOTOR

Douglas Collins, Salisbury, N. C.

Application March 5, 1934, Serial No. 714,148

16 Claims. (Cl. 290—38)

My present invention relates to improvements in electric starting motors designed especially for use as means for starting or cranking internal combustion engines. In carrying out my invention I employ a split motor of the self-engaging type, and I contemplate the use of this motor as a unit in a system of control for automotive vehicles, aircraft, watercraft, and in other connections, where the motor circuit, is closed and my starting motor is energized by the use of suitable operating means. In such systems, automatically operating means are employed, after the engine is started, for breaking the motor circuit and thus de-energizing the starting motor, after which the motor of my invention is automatically operated to disengage the power transmitting elements.

In the present exemplification of my invention, for convenience of illustration, I have disclosed the split-motor for self-engagement with and disengagement from a geared fly-wheel of an internal combustion engine, and in carrying out my invention the driving pinion of the electric motor is moved radially into the plane of the driven gear for self-engagement with the gear. Means are also employed whereby the driving pinion is moved radially out of the plane of the gear for disengagement therefrom, after the motor is de-energized.

The driving pinion is rigidly mounted on the armature shaft of the electric motor, and the starting motor, when energized first operates as an electro-magnet, to cause the self-engaging movement of the pinion, through the arc of a circle and radially with relation to the driven gear, which movement brings the driving pinion into the same plane in which the driven gear is located, and the pinion and gear are meshed. This self-engagement of the motor with the driven gear is accomplished by a low-power development created in the motor, and then the high-power or maximum force of the electric motor operating in usual manner is exerted to transmit power through the driving member of the motor and the driven member of the engine, for starting the latter.

The invention consists essentially in certain novel combinations and arrangements of parts in a split or divided motor of this type, and in specific constructions embodied in the motor, as well as in the means employed in the operation of the invention, as will hereinafter be more fully set forth and claimed.

In the accompanying drawings I have illustrated one complete example of the physical embodiment of my invention wherein the parts thereof are combined and arranged according to one mode I have thus far devised for the practical application of the principles of my invention. It will be understood that changes and alterations may be made in the exemplified structures and in the complete disclosure, within the scope of my appended claims, without departing from the principles of my invention.

It is intended that all of the matter contained in the following description, or shown in the accompanying drawings, shall be interpreted as illustrative, and not in a limiting sense; and the language of the claims is intended to cover all generic and specific features of the invention.

Figure 4:
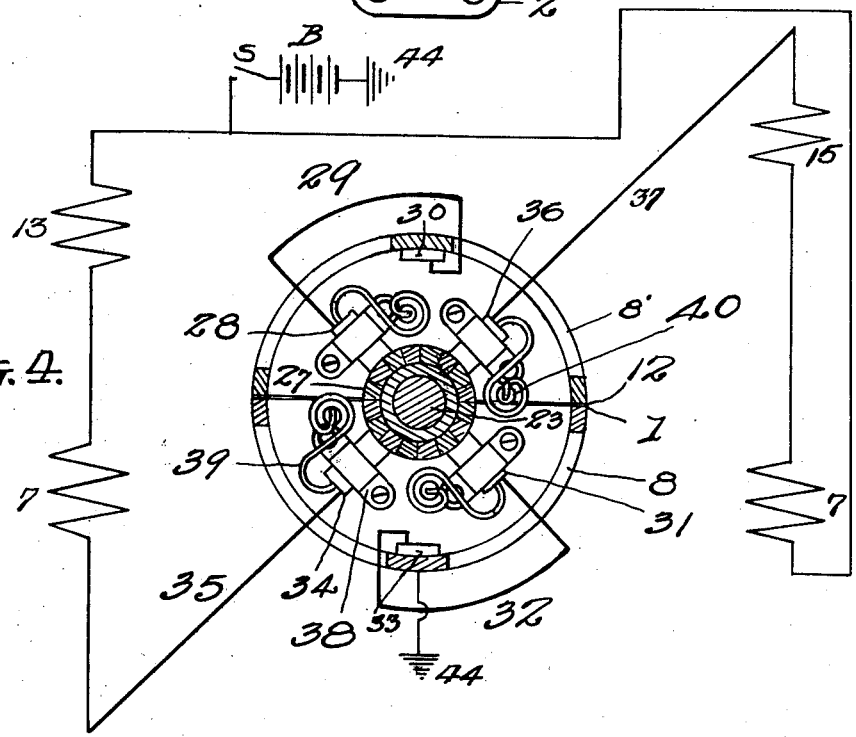

Figure 1 is a view of the starting motor involving my invention, showing the power-transmitting means disengaged, and Figure 2 is a longitudinal sectional view with the power-transmitting means engaged. Figure 3 is a transverse sectional view at line 3—3 of Figure 2, showing my arrangement of a standard armature and its field; and Figure 4 is a sectional diagrammatic view at line 4—4 of Figure 2.

In order that the general relation and utility of parts may readily be understood I have indicated in Figure 1 of the drawings an internal combustion engine as E, with its crank shaft C, and the gear ring G of the fly-wheel mounted on the crank shaft.

The electric starting motor, which may be mounted in any convenient location in proper relation to the engine E, is divided, and fashioned with a split casing or sectional casing, and these sections are shown as semi-cylindrical in shape. The section 1 may be fixed on a portion of the engine, the fly-wheel casing, or other suitable support, and for this purpose the section is formed with spaced attaching flanges 2, 2, that are fastened by means of bolts 3, 3 to a bracket 4 that is fixed in suitable manner to the exterior of the engine.

Within the fixed section 1 of the starter casing are secured two field cores 5, 5, by means of screws 6 passed through the casing from the exterior thereof and threaded into the cores, and the wires or coils which are indicated at 7, 7, are wound upon the cores in usual and appropriate manner.

For ready access to the interior of the casing section 1, slots 8 are provided adjacent the semi-circular end of head 9, and a semi-circular end plate 10 is bolted at 11 to the exterior of the head or end of the casing-section.

The complementary casing-section 12, also of semi-cylindrical shape, is movable with relation to the fixed section 1, and this movable section has mounted therein two field cores 13, secured by screws 14 from the exterior of the casing-section, and the coils or windings are designated as 15, the coils or fields 5—7 and 13—15 being complementary, and arranged within the starter casing at diametrically opposite sides of the longitudinal center of the starter casing.

The movable casing-section and its field are thus rigidly secured together, and the section 12 is provided with slots 8' for ready access to the interior of the casing-section. This movable casing-section is also provided with a rigid end or head 16 of semi-circular shape, and an end plate 17 is bolted to the exterior face of the head as at 11.

As shown in Figures 1 and 2 the plate 17, rigid with the casing-section 12, is fashioned with an integral bearing boss 18, and as indicated in Figure 3, the semi-circular head 9—10 of the fixed casing-section 1 is cut out to accommodate the bearing boss.

A circular head 19 is bolted at 20 to the semi-cylindrical casing-section 12, and the free portion of this circular head projects over the open end of the fixed casing-section 1, as indicated in Figures 1 and 2. This head 19 also has a bearing boss, as 21, axially alined with the bearing boss 18, and the armature 22, which is housed in the split casing, has its shaft 23 journaled in the bearings 18 and 21, the armature of course being located between the two pairs of field coils of the motor.

As shown, the armature shaft projects at one end beyond the head 19 of the split casing, and a pinion 24 is keyed on the shaft to revolve therewith. To insure a long journal bearing for the armature shaft a suitable bracket arm 25, rigid with the head 19 may be extended therefrom, and provided with a third journal bearing 26 for the shaft.

The electric starting motor is equipped with a suitable commutator 27 on the armature shaft and located in the space between the armature and the head 9—14 at one end of the split motor, and four brushes are illustrated in contact with the commutator.

The brush 28 is connected by its wires 29 to the movable casing-section at 30; the diametrically opposed brush 31 is connected by its wires 32 to the fixed casing-section at 33; the brush 34 is connected by its wires 35 to one of the fixed field-coils 7; and the brush 36 is connected by its wires 37 to the other fixed field coil 7. In Figure 3, coils 15, 15 are connected by wires 35a to the button 41, and field-coils 7—15 are connected together in pairs.

The brushes are mounted in suitable holders as 38 that are supported in appropriate manner on the head-sections 9 and 14, and springs 39 connected at one end to the brushes and anchored at their other ends to pins 40, hold the brushes in contact at all times with the commutator. The pins 40 are suitably fixed on the head sections, and the springs provide a resilient means for urging the brushes at all times in contact with the commutator.

Electric current for operating the electric motor is supplied to the contact button 41 through wire 42, to the movable portion of the motor, and a ground wire 43 is indicated in Figures 1 and 2 for grounding the motor circuit at 44, which is indicated as a part of the engine. It will be understood that any other suitable electric connections may be made for the motor circuit in supplying current to the motor for operating the latter.

The movable portion of the electric motor or starter is mounted on the fixed portion of the starter, and for this purpose a hinged or pivot connection, remote from the power transmitting member or pinion 24, is provided between the two casing-sections. Thus the movable casing section 12 is provided with a pair of widely spaced exterior bearing lugs 45, and the fixed casing-section 1 is provided with a pair of complementary exterior bosses 46, and a pivotal connection between the parts is made by the use of the two axially alined pivot bolts 47, which may be threaded into the bosses, and which provide journal bearings on which the movable portion of the starter may tilt, rock, or swing, when the motor is energized by the passage of electric current therethrough.

By means of this tilting, swinging, or rocking motion of the movable part of the starter the pinion 24 is engaged with the gear G, and the latter is then revolved by the former. To release the pinion 24 from the gear G, after it has performed its functions, I provide a spring 48, interposed between a bushing 49 which may be adjustable on the pin 50 that is rigid with the head 19, and a guide pin 51 having a rigid support. The spring is compressed when the pinion 24 swings to position to engage the gear, as in Figure 2, and by its tension, the compressed spring disengages the pinion from the gear G when free to do so.

In Figure 1 particularly, it will be noted that there is a gap indicated by the edge 52 of the movable part of the starter, and the edge 53 of the fixed portion of the starter, between the two casing-sections, and in this position, (i. e. the disengaged position of the starter) there is also a gap between the armature and the two fixed field coils 7.

This gap, it will be seen in Figure 1, is closed at the left side of the pivot 47, with the abutting edges of the casing-sections in contact, and these abutting edges limit the pivotal movement at 47 of the casing-section 12, its field 13—15, and the armature and its shaft, under tension of the spring 48 which disengages the pinion from the gear after the motor is de-energized.

Inasmuch as the pinion 24, when swinging into and out of engagement with the gear G, must move through the arc of a circle that is greater in length than the depth of the teeth of the gear G, the width of the gap must be such as to permit this required movement. Therefore, from the pivot point 47 (which is approximately the meeting point of the two edges) to the right, i. e. toward the pinion 24 in Figure 1, the gap between the two edges 52 and 53 increases in width. When the pinion is engaged with the gear, these two edges 52 and 53 are in close contact, and the entire casing is a substantially closed housing for the fields and armature, with the parts of the motor in their proper positions for performing their usual functions.

As indicated in Figure 1, where the motor is shown at rest with the pinion 24 disengaged from the gear, the armature shaft on which the pinion is fixed is disposed in a plane at an angle to the longitudinal axis of the crank shaft of the engine, and the pinion is disposed in a plane at an angle to the plane of the gear. In Figure 2, where the pinion is engaged with the gear, the movable portion of the split motor, including the armature shaft is disposed in a plane parallel with the fixed portion of the motor and parallel with the longitudinal axis of the crank shaft; and the pinion is also disposed in the same plane as that of the gear.

Thus it will be apparent that the pinion, in its arcuate swing, radially of the gear, moves into parallelism with the gear in the self-engaging operation of the motor, and that the pinion moves out of parallelism with relation to the gear when the pinion is automatically disengaged from the gear.

In Figure 1 a motor circuit is diagrammatically indicated with a switch S and battery B, and it will be seen that when the switch is closed, in any suitable manner, the electricity enters the motor through the button or contact member 41 to energize the starter which is shown at rest in this figure of the drawing. This flow of electricity first causes the two casing-sections and the motor elements to perform the functions of an electro-magnet, whereby the magnetic force naturally draws the movable part of the motor toward its fixed portion, against the tension of the disengaging spring or springs. The performance of this function of the motor develops a comparatively weak force, or partial power, of the motor, because of the presence of the gap between the edges 52 and 53 and the fixed and movable parts of the motor. When the starting motor circuit is closed, the fields, as well as the armature, are energized. Since, however, the magnetic circuit is weakened, due to the longitudinal air gap between the two housing sections, these spaced sections act as an electro-magnet, and the movable section of the motor is thereby pulled slowly toward the fixed section, the circuit becoming more powerful as the two sections draw nearer. This power is increased as the gap between the two edges is closed, until the pinion is completely or fully meshed with the gear.

By thus introducing the teeth of the pinion to the teeth of the gear, in a radial direction, the full width or face of a pinion tooth engages complementary parts of a gear tooth, and this meshing of the gears, or pinion and gear, permits the employment of relatively heavy teeth, which construction, in turn, reduces the possibility of stripping the pinion of the gear at the time of meshing.

With the pinion mounted rigidly on the armature shaft, it will be apparent that when the pinion is meshed with the gear the maximum torque is available and is applied for revolving the gear.

It will be noted that the exertion of partial power, due to the separation of parts of the split motor, for self-engagement of the starter when it is energized, retards the rotation of the armature, its shaft, and the pinion, and during this retarded operation, or comparatively weak exertion of energy of the motor, the pinion is being engaged with the gear. With the full closing of the gap between the movable and fixed parts of the motor, all of the elements of the motor, as well as the pinion and the gear, are in close working position, and the full force of the electric motor is developed for transmission of power through the pinion and gear to the crank shaft of the engine for starting the latter.

Thus a minimum or partial force of the self-engaged motor is utilized to engage the pinion and gear, and the maximum power or force of the motor or starter is available, and is exerted, for starting the engine.

After the engine has started, the switch of the starting-motor circuit is opened in suitable manner, the motor is de-energized, and the compressed spring 48, under tension, pushes the movable part of the motor away from the fixed part, thus disengaging the pinion from the gear.

While I have shown a toothed pinion and gear as the power transmitting elements, it will be apparent that I may employ a worm drive, or any other suitable power-transmitting means between the starter and the engine, and it will also be apparent that changes may be made, as are required, for different installations of the starter of my invention, without departing from the principles of my invention.

Having thus fully described my invention, what I claim as new and desire to secure by Letters Patent is:

1. The combination with a driven-member, of a longitudinally divided electric motor comprising a fixed section and a laterally movable section, and a motor-driven member movable with the movable section, whereby the motor-driven member is moved laterally into power-transmitting engagement with the driven-member when the electric motor is energized.

2. In a self-engaging starter, the combination with a fixed-section of an electric motor, of a laterally movable-section of said motor, and a motor-driven member movable with the movable-section, whereby said motor-driven member is moved laterally to engaging position when the electric motor is energized.

3. The combination with an engine-driven member, of a longitudinally divided electric motor comprising a fixed section and a laterally movable section, a motor-driven member mounted in the movable section, whereby the motor-driven member is moved laterally into power-transmitting engagement with the engine-driven member when the electric motor is energized, and means for disengaging said members when the engine is running.

4. The combination with an electric motor, its circuit and a circuit maker therefor, said motor comprising a fixed section, a laterally movable section, and a motor-driven member mounted in the movable section, of an engine-driven member, means for closing the circuit maker whereby the motor-driven member is moved laterally into power-transmitting engagement with the engine-driven member, and means for disengaging said members when the engine-driven member is running.

5. The combination with an engine-driven member, of a divided electric motor comprising a fixed section and a laterally movable section with a longitudinal gap therebetween, a motor-driven member mounted in the movable section, whereby the latter member is moved laterally into power-transmitting engagement with the engine-driven member when the motor is energized, and automatic means for disengaging said members when the motor is de-energized.

6. The combination with an engine-driven member, of a divided electric motor comprising a fixed section and fixed field; a movable section, a field rigid with said movable section, an armature and its shaft mounted in the movable section, and a motor-driven member rigid with said shaft; whereby said members are brought into power-transmitting engagement when the motor is energized.

7. The combination with an engine-driven member, of a divided electric motor comprising a fixed section and fixed field; a movable section and its field, an armature and its shaft mounted in this section, and a motor-driven member rigid with the shaft; whereby the motor-driven member is moved into power-transmitting engagement with the engine-driven member when the motor is energized; and means for disengaging said members when the motor is de-energized.

8. The combination with an engine-driven member, of a longitudinally divided electric motor comprising a fixed section and a laterally movable section pivoted in relation thereto to form a gap, and a motor-driven member mounted on the movable section, whereby the latter member is moved into power-transmitting engagement with the former member when the motor is energized.

9. In an engine starter, the combination with an engine-driven member, of a divided electric motor comprising a fixed section and its field; a pivoted section and its field, an armature and its shaft journaled in this section, and a motor driven member on the shaft; whereby said members are engaged for power-transmission when the motor is energized; and automatic means for disengaging said members when the motor is de-energized.

10. In an engine starter, the combination with an engine-driven member, of a divided electric motor comprising a fixed section and field; a pivoted section and its field, an armature and its shaft journaled in this section, and a motor-driven member on the shaft; whereby said members are engaged for power-transmission when the motor is energized; automatic means for disengaging said members when the motor is de-energized; and means to prevent excess separation between said sections.

11. In a self-engaging engine starter, the combination with an engine-driven member, of a longitudinally divided electric motor and its laterally movable motor-driven member, whereby means are provided for creating a low-power under influence of the motor for causing power-transmitting engagement of said members, and whereby means are provided for creating a high-power under influence of the motor for transmitting power through the lateral engagement of said members.

12. In a self-engaging engine starter, the combination with an engine-driven member, of a longitudinally divided electric motor and its laterally movable motor-driven member, whereby means are provided for creating a low-power under influence of the motor when energized for causing power-transmitting engagement of said members, whereby means are provided for creating a high-power under influence of the motor when energized for transmitting power through the engaged members, and means for automatically disengaging said members when the motor is de-energized.

13. In an engine starter, the combination with an engine-driven member, of an electric motor including its armature shaft and a motor-driven member on the shaft, means under influence of the motor to coincide the longitudinal axes of the field and armature of the motor whereby said members are engaged for power-transmission, and automatic means for causing the longitudinal axes of the field and armature to assume non-coincidental positions whereby said members are disengaged when the motor is de-energized.

14. In an engine starter, the combination with an engine-driven member, of an electric motor having a stationary field-portion, a relatively movable armature and its shaft and a motor driven member on the shaft, means under influence of the motor to coincide the longitudinal axes of the field and armature of the motor whereby said members are engaged for power-transmission, and automatic means for causing the field and armature to assume non-coincidental positions as to their axes whereby said members are disengaged when the motor is de-energized.

15. The combination with a driven gear, of an electric starting-motor comprising a fixed section including a field-portion; a movable section including a field-portion, an armature and its shaft and a driving gear on the shaft; automatic means for separating said sections when the motor is de-energized; and means for moving the armature into concentric relation with the motor field whereby said gears are engaged.

16. The combination with a driven gear, of an electric starting motor comprising a fixed section including a field-portion; a movable section including a field-portion, an armature and its shaft and a driving gear on the shaft; a spring device for separating said sections; and electro-magnetic means moving the armature into concentric relation with the motor-field whereby said gears are engaged when the motor is energized.

DOUGLAS COLLINS.